US010631006B2

(12) United States Patent
Lim et al.

(10) Patent No.: US 10,631,006 B2
(45) Date of Patent: Apr. 21, 2020

(54) ENCODING APPARATUS AND DECODING APPARATUS FOR DEPTH IMAGE, AND ENCODING METHOD AND DECODING METHOD

(71) Applicant: SAMSUNG ELECTRONICS CO., LTD., Suwon-si, Gyeonggi-do (KR)

(72) Inventors: Il Soon Lim, Chungcheongnam-do (KR); Byung Tae Oh, Seoul (KR); Ho Cheon Wey, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 385 days.

(21) Appl. No.: 14/650,058

(22) PCT Filed: Jan. 3, 2014

(86) PCT No.: PCT/KR2014/000035
§ 371 (c)(1),
(2) Date: Jun. 5, 2015

(87) PCT Pub. No.: WO2014/107038
PCT Pub. Date: Jul. 10, 2014

(65) Prior Publication Data
US 2015/0350677 A1    Dec. 3, 2015

Related U.S. Application Data

(60) Provisional application No. 61/748,886, filed on Jan. 4, 2013.

(30) Foreign Application Priority Data

Dec. 31, 2013 (KR) .................. 10-2013-0168877

(51) Int. Cl.
H04B 1/66       (2006.01)
H04N 19/597     (2014.01)
(Continued)

(52) U.S. Cl.
CPC ......... *H04N 19/597* (2014.11); *H04N 19/463* (2014.11); *H04N 19/593* (2014.11); *H04N 19/70* (2014.11); *H04N 19/11* (2014.11)

(58) Field of Classification Search
CPC .... H04N 19/13; H04N 19/597; H04N 19/105; H04N 13/161; H04N 19/107;
(Continued)

(56) References Cited

U.S. PATENT DOCUMENTS

| | | | | |
|---|---|---|---|---|
| 2015/0172717 | A1* | 6/2015 | Zhao | H04N 19/597 375/240.16 |
| 2015/0229957 | A1* | 8/2015 | Zhao | H04N 19/597 375/240.12 |
| 2015/0245061 | A1* | 8/2015 | Chen | H04N 19/597 375/240.13 |

FOREIGN PATENT DOCUMENTS

| | | |
|---|---|---|
| CN | 1926417 | 3/2007 |
| KR | 10-2010-006304 | 6/2010 |

(Continued)

OTHER PUBLICATIONS

Jager, F. (Simplified depth map intra coding with an optional depth lookup table. IEEE, 2012 International Conference on 3D Imaging (IC3D), p. 1-4, Dec. 3-5, 2012).*

(Continued)

*Primary Examiner* — Masum Billah
(74) *Attorney, Agent, or Firm* — Staas & Halsey LLP

(57) ABSTRACT

Disclosed are an encoding apparatus and decoding apparatus for a depth image and an encoding method and decoding method. To process a depth image according to an intra prediction mode, the encoding apparatus or the decoding apparatus may use a representative mode from a DC mode of an SDC mode, a planar mode, or DMM1. Further, to process the depth image according to an intra prediction mode, the encoding apparatus or the decoding apparatus
(Continued)

may use a representative mode from a planar mode or DMM1.

14 Claims, 10 Drawing Sheets

(51) Int. Cl.
*H04N 19/463* (2014.01)
*H04N 19/593* (2014.01)
*H04N 19/70* (2014.01)
*H04N 19/11* (2014.01)

(58) Field of Classification Search
CPC ...... H04N 19/11; H04N 19/136; H04N 19/14; H04N 19/159; H04N 19/176; H04N 19/179; H04N 19/20; H04N 19/43
USPC .......................................................... 375/240
See application file for complete search history.

(56) References Cited

FOREIGN PATENT DOCUMENTS

| KR | 10-2011-0054244 | 5/2011 |
| KR | 10-2012-0000485 | 1/2012 |
| KR | 10-2012-0083209 | 7/2012 |

OTHER PUBLICATIONS

Chinese Office Action dated Oct. 23, 2017 in Chinese Patent Application No. 201480004107.1.

* cited by examiner

FIG. 5

| p0,0 | p1,0 | p2,0 | p3,0 | p4,0 | p5,0 | p6,0 | p7,0 |
|------|------|------|------|------|------|------|------|
| p0,1 | p1,1 | p2,1 | p3,1 | p4,1 | p5,1 | p6,1 | p7,1 |
| p0,2 | p1,2 | p2,2 | p3,2 | p4,2 | p5,2 | p6,2 | p7,2 |
| p0,3 | p1,3 | p2,3 | p3,3 | p4,3 | p5,3 | p6,3 | p7,3 |
| p0,4 | p1,4 | p2,4 | p3,4 | p4,4 | p5,4 | p6,4 | p7,4 |
| p0,5 | p1,5 | p2,5 | p3,5 | p4,5 | p5,5 | p6,5 | p7,5 |
| p0,6 | p1,6 | p2,6 | p3,6 | p4,6 | p5,6 | p6,6 | p7,6 |
| p0,7 | p1,7 | p2,7 | p3,7 | p4,7 | p5,7 | p6,7 | p7,7 |

| p0,0 | p1,0 | p2,0 | p3,0 | p4,0 | p5,0 | p6,0 | p7,0 |
|------|------|------|------|------|------|------|------|
| p0,1 | p1,1 | p2,1 | p3,1 | p4,1 | p5,1 | p6,1 | p7,1 |
| p0,2 | p1,2 | p2,2 | p3,2 | p4,2 | p5,2 | p6,2 | p7,2 |
| p0,3 | p1,3 | p2,3 | p3,3 | p4,3 | p5,3 | p6,3 | p7,3 |
| p0,4 | p1,4 | p2,4 | p3,4 | p4,4 | p5,4 | p6,4 | p7,4 |
| p0,5 | p1,5 | p2,5 | p3,5 | p4,5 | p5,5 | p6,5 | p7,5 |
| p0,6 | p1,6 | p2,6 | p3,6 | p4,6 | p5,6 | p6,6 | p7,6 |
| p0,7 | p1,7 | p2,7 | p3,7 | p4,7 | p5,7 | p6,7 | p7,7 |

FIG. 8

| sequence parameter set( ) { | C | Descriptor |
|---|---|---|
| .... | | |
| depth lookup table( ) ; | | |
| .... | | |
| } | | |

| slice header( ) { | C | Descriptor |
|---|---|---|
| .... | | |
| dlt_enable_flag | | |
| .... | | |
| } | | |

FIG. 9

| slice header( ) { | C | Descriptor |
|---|---|---|
| .... | | |
| depth lookup table( ) ; | | |
| .... | | |
| } | | |

FIG. 10

| sequence parameter set( ) { | C | Descriptor |
|---|---|---|
| .... | | |
| depth lookup table( ) ; | | |
| .... | | |
| } | | |

| slice header( ) { | C | Descriptor |
|---|---|---|
| .... | | |
| dlt_enable_flag | | |
| depth lookup table( ) ; | | |
| .... | | |
| } | | |

ENCODING APPARATUS AND DECODING APPARATUS FOR DEPTH IMAGE, AND ENCODING METHOD AND DECODING METHOD

CROSS REFERENCE TO RELATED APPLICATIONS

This application is U.S. National Phase application of International Application No. PCT/KR/2014/000035, filed Jan. 3, 2014, which claims the benefit of U.S. Application No. 61/748,886, filed Jan. 4, 2013 and Korean Application No. 10-2013-0168877, filed Dec. 31, 2013, the disclosures of all of which are incorporated herein by reference.

TECHNICAL FIELD

The following embodiments relate to processing of a depth image based on a simplified depth coding (SDC) mode when the depth image is encoded or decoded. In particular, embodiments may be applicable to a video compression field in which a bit rate of a depth image needs to be reduced due to a limited bandwidth.

BACKGROUND ART

To encode or decode a depth image, an intra prediction or an inter prediction may be used. The intra prediction may be performed based on a spatial correlation between coding units, and the inter prediction scheme may be performed based on a temporal correlation between coding units.

In a compression scheme according to a related art, to perform an intra prediction of a depth image, a plurality of modes may be set and a coding mode with the lowest cost may be applied to a coding unit. However, because the depth image has a specific gray level among gray levels of "0" to "255," a more efficient coding mode may need to be set to reduce a bit rate required when the depth image is transmitted.

DISCLOSURE OF INVENTION

Technical Goals

An aspect of embodiments provides a method and apparatus for processing a coding unit based on one representative mode among a Depth Coding (DC) mode, a planar mode and a depth modeling mode 1 (DMM1) in a Simplified Depth Coding (SDC) mode when a depth image is encoded or decoded based on an intra prediction mode. Here, DC mode is defined to Direct Component mode, and SDC mode is defined to Segment-wise Direct Component mode.

Another aspect of embodiments provides a method and apparatus for processing a coding unit based on one representative mode among a planar mode and a DMM1 in an SDC mode when a depth image is encoded or decoded based on an intra prediction mode.

Still another aspect of embodiments provides a method and apparatus for encoding or decoding a current block corresponding to a coding unit of a depth image based on an SDC mode of an upper block or a left block neighboring the current block.

TECHNICAL SOLUTIONS

According to an aspect, there is provided a method of encoding a depth image, the method including: encoding a coding unit of the depth image based on a simplified depth coding (SDC) mode; and generating a bitstream including the SDC mode applied to the coding unit and residual information of the coding unit, wherein the SDC mode includes a planar mode or a depth modeling mode 1 (DMM1).

The encoding may include encoding the coding unit based on an SDC mode of an upper block or a left block neighboring a current block corresponding to the coding unit.

The residual information of the coding unit may be mapped to an index based on a depth lookup table (DLT) generated for each frame of the depth image.

According to another aspect, there is provided a method of encoding a depth image, the method including: encoding a coding unit of the depth image based on an SDC mode; and generating a bitstream including the SDC mode applied to the coding unit and residual information of the coding unit, wherein the SDC mode includes a depth coding (DC) mode, a planar mode or a DMM1.

The encoding may include encoding the coding unit based on an SDC mode of an upper block or a left block neighboring a current block corresponding to the coding unit.

The residual information of the coding unit may be mapped to an index based on a DLT generated for each frame of the depth image.

According to another aspect, there is provided a method of decoding a depth image, the method including: determining an SDC mode associated with an intra prediction applied to a coding unit of the depth image; and decoding the coding unit based on the SDC mode, wherein the SDC mode includes a planar mode or a DMM1.

The planar mode may be an SDC mode using an original depth value and a predicted depth value based on a top-left sample, a top-right sample, a bottom-left sample and a bottom-right sample among a plurality of samples included in the coding unit.

The DMM1 may be an SDC mode using an original depth value and a predicted depth value of each segment derived from a top-left sample, a top-right sample, a bottom-left sample and a bottom-right sample that belong to the same segment in the coding unit.

According to another aspect, there is provided a method of decoding a depth image, the method including: determining an SDC mode associated with an intra prediction applied to a coding unit of the depth image; and decoding the coding unit based on the SDC mode, wherein the SDC mode includes a DC mode, a planar mode or a DMM1.

The planar mode may be an SDC mode using an original depth value and a predicted depth value based on a top-left sample, a top-right sample, a bottom-left sample and a bottom-right sample among a plurality of samples included in the coding unit.

The DMM1 may be an SDC mode using an original depth value and a predicted depth value of each segment derived from a top-left sample, a top-right sample, a bottom-left sample and a bottom-right sample that belong to the same segment in the coding unit.

According to another aspect, there is provided a method of decoding a depth image, the method including: determining an SDC mode associated with an intra prediction applied to a coding unit of the depth image; and decoding the coding unit based on the SDC mode, wherein the SDC mode comprises a planar mode, a depth modeling mode 1 (DMM1) and a depth modeling mode 2 (DMM2), and wherein a depth coding (DC) mode is excluded from the SDC mode.

According to another aspect, there is provided a method of decoding a depth image, the method including: determining an SDC mode associated with an intra prediction applied to a coding unit of the depth image; and decoding the coding unit based on the SDC mode, wherein the SDC mode comprises a planar mode, and a depth modeling mode 1 (DMM1), wherein a depth coding (DC) mode and a depth modeling mode 2 (DMM2) are excluded from the SDC mode.

According to another aspect, there is provided an apparatus for encoding a depth image, the apparatus including a processor, wherein the processor performs: encoding a coding unit of the depth image based on an SDC mode; and generating a bitstream including the SDC mode applied to the coding unit and residual information of the coding unit, and wherein the SDC mode includes a planar mode or a DMM1.

According to another aspect, there is provided an apparatus for encoding a depth image, the apparatus including a processor, wherein the processor performs: encoding a coding unit of the depth image based on an SDC mode; and generating a bitstream including the SDC mode applied to the coding unit and residual information of the coding unit, and wherein the SDC mode includes a DC mode, a planar mode or a DMM1.

According to another aspect, there is provided an apparatus for decoding a depth image, the apparatus including a processor, wherein the processor performs: determining an SDC mode associated with an intra prediction applied to a coding unit of the depth image; and decoding the coding unit based on the SDC mode, and wherein the SDC mode includes a planar mode or a DMM1.

According to another aspect, there is provided an apparatus for decoding a depth image, the apparatus including a processor, wherein the processor performs: determining an SDC mode associated with an intra prediction applied to a coding unit of the depth image; and decoding the coding unit based on the SDC mode, and wherein the SDC mode includes a DC mode, a planar mode or a DMM1.

According to another aspect, there is provided an apparatus for decoding a depth image, the apparatus including a processor, wherein the processor performs: determining an SDC mode associated with an intra prediction applied to a coding unit of the depth image; and decoding the coding unit based on the SDC mode, and wherein the SDC mode comprises a planar mode, a depth modeling mode 1 (DMM1) and a depth modeling mode 2 (DMM2), and wherein a depth coding (DC) mode is excluded from the SDC mode.

According to another aspect, there is provided an apparatus for decoding a depth image, the apparatus including a processor, wherein the processor performs: determining an SDC mode associated with an intra prediction applied to a coding unit of the depth image; and decoding the coding unit based on the SDC mode, and wherein the SDC mode comprises a planar mode, and a depth modeling mode 1 (DMM1), wherein a depth coding (DC) mode and a depth modeling mode 2 (DMM2) are excluded from the SDC mode.

Effects of the Invention

According to embodiments, a coding unit may be processed based on one representative mode among a depth coding (DC) mode, a planar mode and a depth modeling mode 1 (DMM1) in a simplified depth coding (SDC) mode when a depth image is encoded or decoded based on an intra prediction mode and thus, it is possible to enhance an efficiency of processing the coding unit.

Additionally, according to embodiments, a coding unit may be processed based on one representative mode among a planar mode and a DMM1 in an SDC mode when a depth image is encoded or decoded based on an intra prediction mode and thus, it is possible to enhance an efficiency of processing the coding unit.

Furthermore, according to embodiments, a current block corresponding to a coding unit of a depth image may be encoded or decoded based on an SDC mode of an upper block or a left block neighboring the current block and thus, it is possible to more effectively reflect a characteristic of the depth image.

BRIEF DESCRIPTION OF DRAWINGS

FIG. 5 is a diagram illustrating a process of deriving a predicted value based on a planar mode according to an embodiment.

FIG. 6 is a diagram illustrating a process of deriving a predicted value based on a DMM1 according to an embodiment.

FIG. 8 is a diagram illustrating enable_flag used to compensate for a depth lookup table (DLT) according to an embodiment.

FIG. 9 is a diagram illustrating an example of a DLT in a slice header according to an embodiment.

FIG. 10 is a diagram illustrating another example of a DLT in a slice header according to an embodiment.

DETAILED DESCRIPTION FOR CARRYING OUT THE INVENTION

The following detailed description is provided in order to explain the embodiments by referring to the figures.

Figure 1:
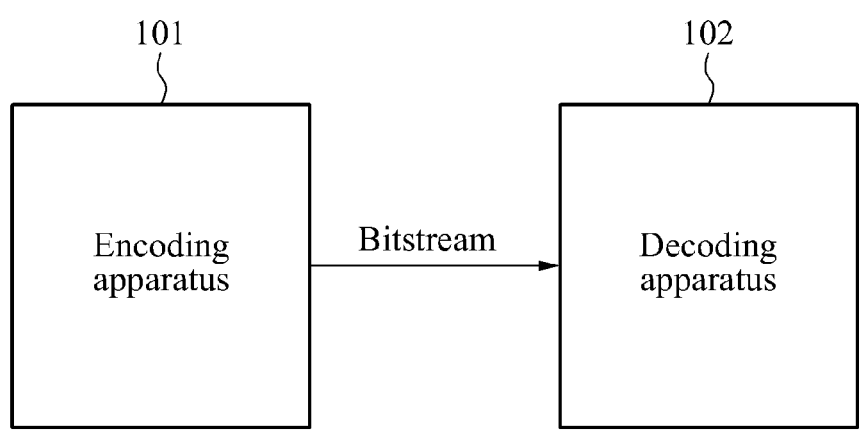
FIG. 1 is a diagram illustrating an encoding apparatus and a decoding apparatus according to an embodiment.

FIG. 1 is a diagram illustrating an encoding apparatus and a decoding apparatus according to an embodiment.

Referring to FIG. 1, an encoding apparatus 101 may transmit a bitstream generated by encoding a depth image to a decoding apparatus 102. Alternatively, the encoding apparatus 101 may encode a depth image, and may store the depth image in a recoding medium or store the depth image in a separate file format. The decoding apparatus 102 may derive the depth image from the bitstream, and may play back a three-dimensional (3D) image. Because a bandwidth used to transmit the bitstream is limited, a bit rate of the depth image may need to be reduced. The depth image may be expressed as a depth map.

For example, the encoding apparatus 101 may encode the depth image using an intra prediction. The encoding apparatus 101 may encode the depth image based on an image compression scheme, for example, H.264/advanced video coding (AVC), H.264/multiview video coding (MVC) or high efficiency video coding (HEVC). The encoding apparatus 101 may partition a single depth image into a plurality of coding units, and may perform the intra prediction based on a spatial correlation between the coding units or perform an inter prediction based on a temporal correlation between the coding units.

The intra prediction may be predicting a pixel value of a coding unit to be encoded from pixel values of pixels neighboring the coding unit. A predicted value of the coding unit calculated through the intra prediction may vary based on a size of the coding unit and a scheme of referring to neighboring pixels used for prediction.

In the image compression scheme, a type of intra prediction modes may be defined based on a size of a coding unit and a scheme of referring to neighboring pixels. The encoding apparatus 101 may select one of the intra prediction modes defined in the image compression scheme, and may encode a coding unit. The encoding apparatus 101 may select an intra prediction mode to minimize a bit rate used to encode the coding unit and a distortion of a decoded coding unit. For example, the encoding apparatus 101 may perform encoding based on all the intra prediction modes defined in the image compression scheme, and may select an intra prediction mode with the lowest cost for the encoding as an encoding mode of a coding unit.

When the depth image is encoded based on the intra prediction, the encoding apparatus 101 may generate a depth lookup table (DLT). The DLT may represent a specific gray level by an index based on a characteristic of the depth image. A scheme of increasing an encoding efficiency by representing residual information and a pixel value of a coding unit using an index may be defined as a simplified depth coding (SDC). The depth image may include pixels corresponding specific gray levels among gray levels of "0" to "255" and accordingly, the encoding efficiency may be enhanced when encoding is performed based on an SDC mode.

The encoding apparatus 101 may use a representative mode defined in the SDC mode to encode the depth image. The representative mode may include, for example, a depth coding (DC) mode, a depth modeling mode 1 (DMM1), a depth modeling mode 2 (DMM2), and a planar mode. For example, the encoding apparatus 101 may perform encoding based on three representative modes excluding the DMM2 from four representative modes. In addition, the encoding apparatus 101 may perform encoding based on two representative modes excluding the DC mode and the DMM2 from the four representative modes.

The encoding apparatus 101 may set a representative mode to a coding unit. The encoding apparatus 101 may transfer the representative mode and residual information to the decoding apparatus 102. The residual information may be a result obtained by predicting the coding unit.

Figure 2:
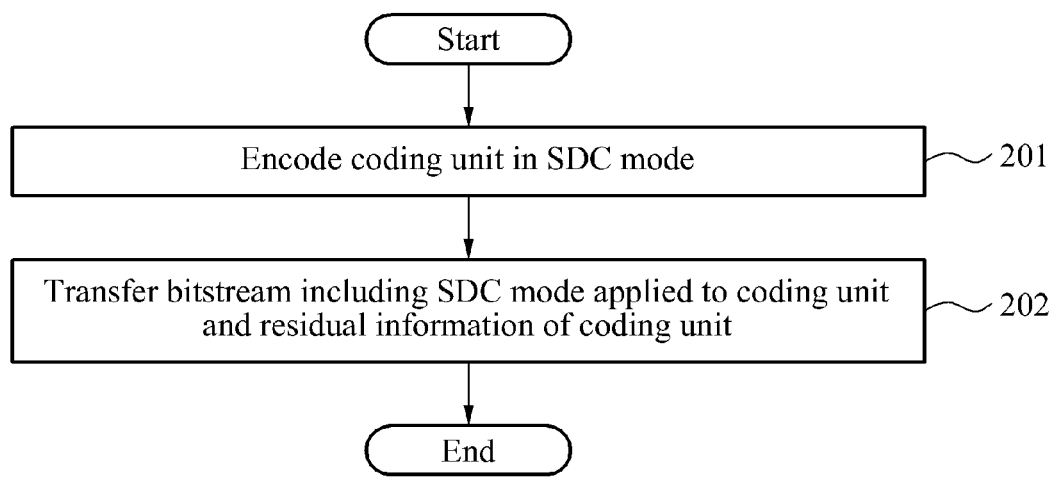
FIG. 2 is a flowchart illustrating an operation of an encoding apparatus according to an embodiment.

FIG. 2 is a flowchart illustrating an operation of an encoding apparatus according to an embodiment.

In operation 201, the encoding apparatus 101 may encode a coding unit based on an SDC mode. To encode the depth image based on the SDC mode, the encoding apparatus 101 may use a few representative modes, instead of using 35 intra prediction modes that are generally used in the HEVC. The depth image may be less complex than a color image and gray levels of the depth image may be distributed in a predetermined range and accordingly, most predictions may be enabled based on a simple representative mode.

The SDC mode may be associated with an intra prediction mode used to encode a depth image to play back a 3D video. In an example, to encode the depth image, the encoding apparatus 101 may use one of the planar mode and the DMM1 excluding the DC mode and the DMM2 from the SDC mode. In other words, the planar mode and the DMM1 may be representative modes in the SDC mode.

In another example, to encode the depth image, the encoding apparatus 101 may use one of the DC mode, the planar mode and the DMM1 excluding the DMM2 from the SDC mode. In other words, the DC mode, the planar mode and the DMM1 may be representative modes in the SDC mode. The encoding apparatus 101 may predict and encode a coding unit based on a representative mode with the highest probability among the representative modes in the SDC mode.

The DC mode may indicate a directional intra prediction in a depth image compression scheme according to a related art. A DMM mode may be used to enhance a distortion rate and a bit rate at a point in time when synthesis is performed during modeling of discontinuities of a depth image. In other words, the encoding apparatus 101 may encode the depth image based on the SDC mode from which a portion of the representative modes is excluded and thus, it is possible to enhance an encoding efficiency.

When an SDC mode for a coding unit is selected, the coding unit may be predicted based on a representative mode of the selected SDC mode. Because prediction is performed based on the SDC mode in one or two depth segments for each coding unit, a single residual DC depth value may be coded to each of the depth segments. A depth segment may include a plurality of pixels. When the SDC mode is used, residual information may be coded in a pixel domain, and accordingly ringing artifacts may be removed.

The SDC mode may be used for intra prediction of a depth image. An SDC flag indicating that the SDC mode is applied to a coding unit may be additionally used. For example, when a coding unit is encoded based on the SDC mode, a size of the coding unit may be determined as "2N×2N." When encoding is performed based on the SDC mode, a representative mode and a segment type of the coding unit may be encoded.

<Representative Mode/Segment Type>
DC (1 segment)
DMM Mode 1—Explicit Wedgelets (2 segments)
DMM Mode 2—Intra-Predicted Wedgelets (2 segments)
Planar (1 segment)

For each segment, residual information in a pixel domain may be signaled in a bitstream. Before encoding, the residual information may be mapped to an original depth value of an unencoded depth image using a DLT. Accordingly, the residual information may be encoded by signaling an index in the DLT.

The encoding apparatus 101 may analyze a histogram by extracting a predetermined number of frames from a plurality of frames of the depth image, and may determine a gray level. The encoding apparatus 101 may generate a DLT shown below, based on the determined gray level.

| index | gray level |
|-------|-----------|
| 0 | 4 |
| 1 | 7 |
| 2 | 12 |
| ... | |
| 50 | 130 |

For example, the encoding apparatus 101 may encode a coding unit in the SDC mode. In this example, the encoding apparatus 101 may combine DLTs and may signal residual information set for each segment, to reduce a required bit rate. The DLT may be a result of mapping original depth values of a depth image to indices. The DLT may be generated by analyzing a specific number of frames from a sequence of an input depth image. The DLT may be used in an encoding process to reduce a bit depth of the residual information.

The encoding apparatus 101 may analyze a specific number of frames from a sequence of a depth image. The frames may be encoded, and all pixels may be scanned for all depth values. During the analyzing, the encoding apparatus 101 may map depth values to valid depth values based on an original depth image that is not compressed, and may generate a mapping table.

However, when a DLT is generated by analyzing a predetermined number of frames, instead of analyzing all frames in a depth image, whether the DLT represents the depth image may be a problem. For example, the encoding apparatus 101 may generate a DLT by analyzing a depth image, and may record the DLT in a sequence parameter set (SPS). The DLT recorded in the SPS may be transmitted to the decoding apparatus 102.

The DLT may be generated based on the following process:
Input: Depth map D_t of N×M pixels at time instance t
Output: depth lookup table D(.)
Index Lookup Table I(.)
Depth Mapping Table M(.)
Number of valid depth values d_valid
<Algorithm>
Initialization
boolean vector B(d)=FALSE for all depth values d
index counter i=( )
Process each pixel position p in D_t for multiple time instances t:
Set B(D_t(p))=TRUE to mark valid depth values
Count number of TRUE values in B(d)? d_valid
For each d with B(d)==TRUE:
Set D(i)=d
Set M(d)=d
Set I(d)=i
i=i+1
For each d with B(d)==FALSE:
Find d☐=arg min|d−d☐| and B(d☐)==TRUE
Set M(d)=d☐
Set I(d)=I(d☐)

The encoding apparatus 101 may map a depth image to an index corresponding to a depth value, instead of encoding residual information of the depth image for a given coding unit. A mapping table may be transmitted to the decoding apparatus 102 configured to derive the depth value from the index through an inverse of the DLT.

Input: Original depth value d_orig
Predicted depth value d_pred
Index Lookup Table I(.)
Number of valid depth values d_valid
Output: Residual index i_resi to be coded
Algorithm:
i_resi=I(d_orig)−I(d_pred)
An index i_resi of the residual information may be encoded with a flag.

The encoding apparatus 101 may determine an SDC mode to be applied to a current block corresponding to a coding unit, using a block neighboring the current block. For example, the encoding apparatus 101 may determine an SDC mode of an upper block or a left block neighboring the current block, and may determine an SDC mode of the current block. When the upper block or the left block is encoded using an inter prediction mode or an intra predic-tion mode, instead of using the SDC mode, the encoding apparatus 101 may perform exception processing.

In operation 202, the encoding apparatus 101 may transfer a bitstream including residual information of the coding unit and the SDC mode applied to the coding unit to the decoding apparatus 102.

Figure 3:
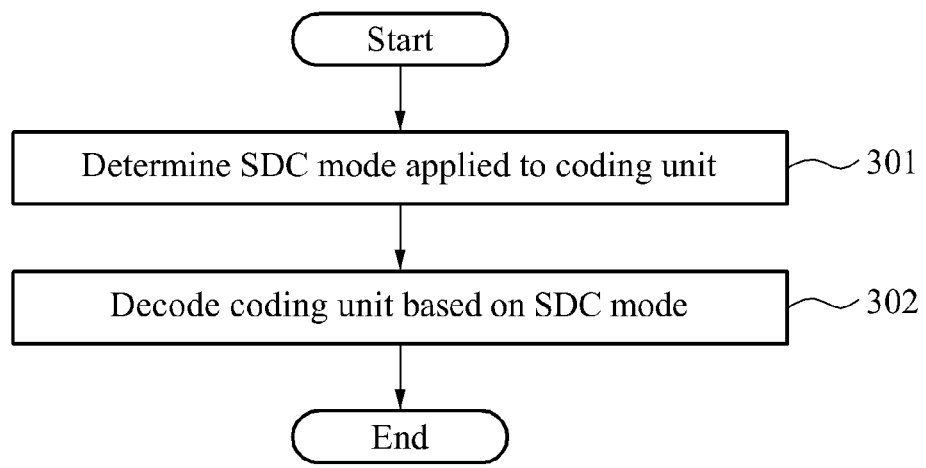
FIG. 3 is a flowchart illustrating an operation of a decoding apparatus according to an embodiment.

FIG. 3 is a flowchart illustrating an operation of a decoding apparatus according to an embodiment.

In operation 301, the decoding apparatus 102 may determine an SDC mode applied to a coding unit. In an example, the decoding apparatus 102 may determine whether one of a planar mode and a DMM1 excluding a DMM2 and a DC mode from the SDC mode is applied to the coding unit. In other words, the DMM1 and the planar mode may be representative modes in the SDC mode.

In another example, the decoding apparatus 102 may determine whether one of a DC mode, a planar mode and a DMM1 excluding a DMM2 from the SDC mode is applied to the coding unit to encode a depth image. In other words, the DC mode, the DMM1 and the planar mode may be representative modes in the SDC mode.

In operation 302, the decoding apparatus 102 may decode the coding unit based on the SDC mode applied to the coding unit.

Figure 4:
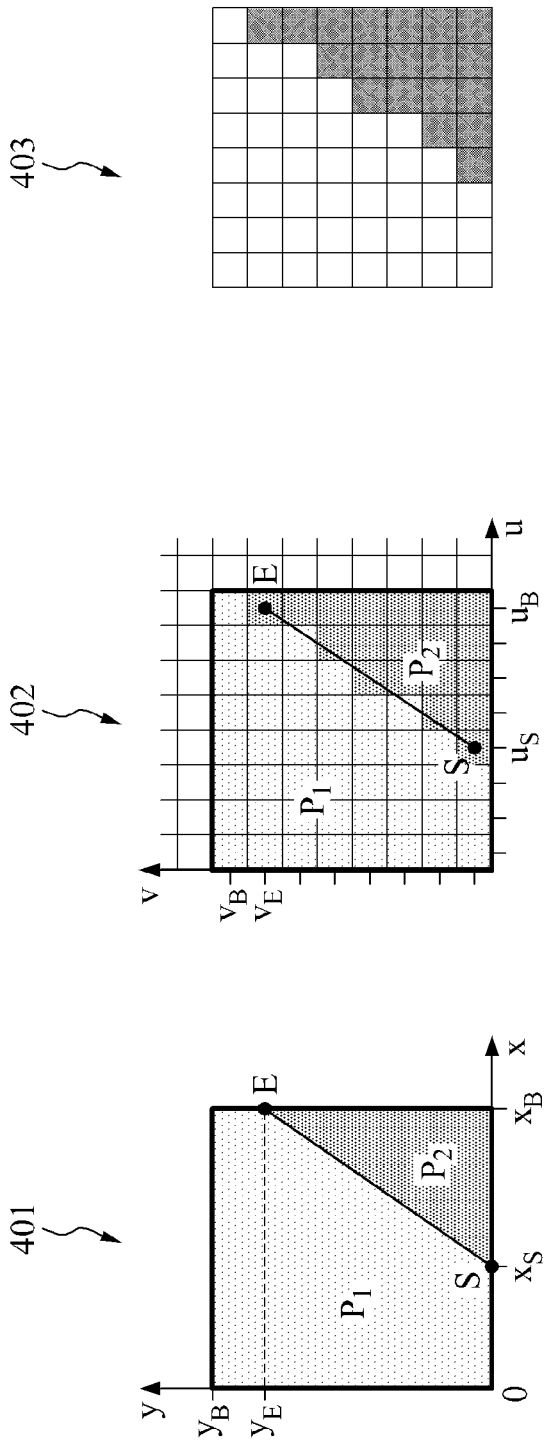
FIG. 4 is a diagram provided to explain a depth modeling mode 1 (DMM1) according to an embodiment.

FIG. 4 is a diagram provided to explain a DMM1 according to an embodiment.

A depth image may mainly include sharp edges representing an object border, and nearly constant or slowly varying sample values that represent object regions. To clearly express the object border in the depth image, an intra prediction mode for the depth image may be added. A block 401 of a depth image may be partitioned into two non-rectangular regions, and each of the non-rectangular regions may be represented by a constant. Samples corresponding to each of the non-rectangular regions may be specified by a constant, and each of the non-rectangular regions may be represented by a constant partition value (CPV). A Wedgelet partitioning scheme and a Contour partitioning scheme may be used as a partitioning scheme, and the DMM1 may be based on the Wedgelet partitioning scheme.

Based on an SDC mode, residual information indicating a difference between an original depth value and a predicted depth value may be transmitted. In a block of a depth image, a predicted depth value may be determined based on a DMM. In the Wedgelet partitioning scheme, the block 401 of the depth image may be partitioned into two regions P1 and P2 by a straight line. A block 402 of the depth image may include a plurality of samples (uB×vB), and each of the samples may belong to one of the two regions.

In addition, samples in a block 403 of the depth image may be identified by binary information based on a region to which each of the samples in the block 403 belongs. The DMM1 may be based on the Wedgelet partitioning scheme, and partition information may be transmitted through a bitstream to the decoding apparatus 102. The decoding apparatus 102 may restore a block of the depth image based on the partition information.

The partition information may be transmitted by the encoding apparatus 101 to the decoding apparatus 102, instead of being predicted by the decoding apparatus 102. A boundary based on the Wedgelet partitioning scheme may be determined to minimize a distortion between the original depth value and a predicted value belonging to a region obtained by the Wedgelet partitioning scheme.

FIG. 5 is a diagram illustrating a process of deriving a predicted value based on a planar mode according to an embodiment.

An SDC mode may replace an intra prediction mode of a depth image. A depth intra parameter of the depth image may indicate whether a coding unit is signaled in the SDC mode. In the SDC mode, a block corresponding to a coding unit of the depth image may be predicted based on one of a planar mode and a DMM1 included in the SDC mode. Also, in the SDC mode, a block corresponding to a coding unit of the depth image may be predicted based on one of a planar mode, a DC mode and a DMM1 included in the SDC mode.

A coding unit including a prediction unit predicted based on the SDC mode may have a partition size of "2N×2N." Residual information may be coded by quantized transform coefficients, and residual information indicating one or two constants may be signaled.

A block coded based on the SDC mode may be signaled based on the following information:

DMM Mode 1—Explicit Wedgelets (2 segments)
Planar (1 segment)

Before encoding, residual information may be mapped to an original depth value of a depth image based on a DLT. The residual information may be coded by signaling an index in the DLT. A DLT representing a mapping table may be transmitted to the decoding apparatus 102.

The encoding apparatus 101 may use an average value of a predicted depth value $d_{pred}$ and an original depth value $d_{orig}$ of the depth image. In a planar mode, the predicted depth value $d_{pred}$ may be calculated as an average value of a top-left sample 501, a bottom-left sample 502, a top-right sample 503 and a bottom-right sample 504 in a prediction block.

FIG. 6 is a diagram illustrating a process of deriving a predicted value based on a DMM1 according to an embodiment.

In the DMM1, a predicted depth value $d_{pred}$ corresponding to a region may be determined as an average value of samples belonging to the region in a prediction block. For example, a predicted depth value $d_{pred}$ corresponding to a region including white samples may be determined as a top-left sample 601. Additionally, a predicted depth value $d_{pred}$ corresponding to a region including black samples may be calculated as an average value of a bottom-left sample 602, a top-right sample 603 and a bottom-right sample 604. A region may correspond to a segment.

A DLT may be used to map an original depth value to a predicted depth value using an index. A residual index iresi may be transmitted to the decoding apparatus 102, and may be determined based on the following Equation 1:

$$t_{resi} = I(d_{orig}) - I(d_{pred}),$$ [Equation 1]

Here, I(.) denotes a DLT. In the decoding apparatus 102, an average value of the restored original depth values may be determined based on the following Equation 2:

$$\hat{d}_{orig} = I^{-1}(I(d_{pred}) + i_{resi}),$$ [Equation 2]

Here, $I^{-1}(.)$ denotes an inverse DLT. Average residual information may be determined based on the following Equation 3:

$$\hat{d}_{resi} = \hat{d}_{orig} - d_{pred}.$$ [Equation 3]

A restored sample $P_{x,y}$ may be determined based on the following Equation 4:

$$\hat{P}_{x,y} = P_{x,y} + \hat{d}_{resi}.$$ [Equation 4]

The calculated residual information $i_{resi}$ may be encoded with a flag.

Figure 7:
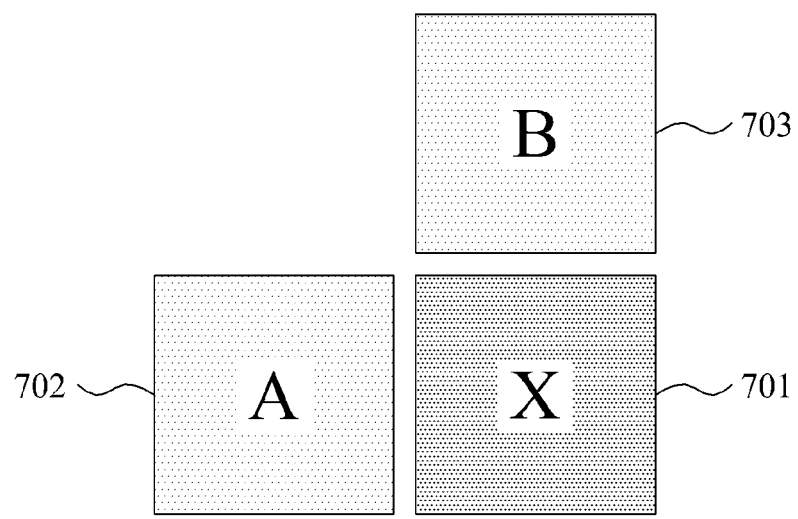
FIG. 7 is a diagram illustrating a process of determining a coding mode of a current block according to an embodiment.

FIG. 7 is a diagram illustrating a process of determining a coding mode of a current block according to an embodiment.

As described above with reference to FIG. 2, the encoding apparatus 101 may determine a coding mode of a current block X 701 corresponding to a coding unit. The encoding apparatus 101 may determine the coding mode of the current block 701 based on an SDC mode applied to a left block A 702 or an upper block B 703 neighboring the current block 701.

For example, when a DC mode in the SDC mode is applied to the left block 702, the DC mode may be applied to the current block 701. When a DMM1 in the SDC mode is applied to the left block 702, the DMM1 may be applied to the current block 701. When a planar mode in the SDC mode is applied to the left block 702, the planar mode may be applied to the current block 701. The same mode as a mode applied to the upper block 703 may be applied to the current block 701.

When an inter prediction mode or an intra prediction mode other than the SDC mode is applied to the left block 702 or the upper block 703, the DC mode may be applied to the current block 701.

FIG. 8 is a diagram illustrating enable_flag used to compensate for a DLT according to an embodiment.

The encoding apparatus 101 may extract a preset number of frames from a sequence of a depth image to be encoded, and may analyze a histogram. The encoding apparatus 101 may determine a gray level by analyzing the histogram, and may generate a DLT based on the determined gray level.

To reflect characteristics of frames other than the preset number of frames, the encoding apparatus 101 may determine and record enable_flag for each of frames of the depth image.

A DLT may be recorded in an SPS. The DLT recorded in the SPS may be transmitted to the decoding apparatus 102. The decoding apparatus 102 may generate a DLT of a current frame of the depth image by analyzing the current frame. The encoding apparatus 101 may compare a gray level of the DLT recorded in the SPS to a gray level of the generated DLT. When a similarity between the gray levels is equal to or greater than a reference value, the encoding apparatus 101 may perform encoding based on an SDC mode, using the DLT recorded in the SPS without a change. Similarly, the decoding apparatus 102 may compare a gray level of the DLT recorded in the SPS to a gray level of the generated DLT. When a similarity between the gray levels is equal to or greater than a reference value, the decoding apparatus 102 may perform decoding based on an SDC mode, using the DLT recorded in the SPS without a change.

When the similarity is less than the reference value, the encoding apparatus 101 may not process a coding unit of the depth image based on the SDC mode. Similarly, when the similarity is less than the reference value, the decoding apparatus 102 may not process a coding unit of the depth image based on the SDC mode.

When a similarity between a DLT of a current frame and the DLT recorded in the SPS is determined to be equal to or greater than a reference value through a comparison between the DLTs, dlt_enable_flag may be "1," and the encoding apparatus 101 or the decoding apparatus 102 may process the coding unit based on the SDC mode. Conversely, when the similarity between the DLT of the current frame and the DLT recorded in the SPS is determined to be less than the reference value through the comparison between the DLTs, dlt_enable_flag may be "0," and the encoding apparatus 101 or the decoding apparatus 102 may not process the coding unit based on the SDC mode.

FIG. 9 is a diagram illustrating an example of a DLT in a slice header according to an embodiment.

The DLT of FIG. 8 may be generated for each frame, and may be recorded in the slice header, instead of an SPS.

FIG. 10 is a diagram illustrating another example of a DLT in a slice header according to an embodiment.

In FIG. 10, a DLT may be recorded in both an SPS and a slice header. When a similarity between a DLT associated with a frame and a DLT recorded in the SPS is determined to be equal to or greater than a reference value through a comparison between the DLTs, the DLT associated with the frame may be recorded in the SPS, not in the slice header.

In other words, when a similarity between a DLT of a current frame and a DLT recorded in the SPS is determined to be equal to or greater than a reference value through a comparison between the DLTs, dlt_enable_flag may be "1," and the DLT recorded in the SPS may be used. Conversely, when the similarity is determined to be less than the reference value, dlt_enable_flag may be "0," and the DLT recorded in the SPS may not be used.

The units described herein may be implemented using hardware components, software components, and/or a combination thereof. The units and components may be implemented using one or more general-purpose or special purpose computers, such as, for example, a processor, a controller and an arithmetic logic unit (ALU), a digital signal processor, a microcomputer, a field programmable array (FPA), a programmable logic unit (PLU), a microprocessor or any other device capable of responding to and executing instructions in a defined manner. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

Software may include a computer program, a piece of code, an instruction, or some combination thereof, to independently or collectively instruct or configure the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

While various embodiments have been described above and in the drawings, it should be understood that they have been presented only as examples, and not as limitations. It should be understood that various modifications may be made the description by one of ordinary skill in the art. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. A method of encoding a depth image, the method comprising:
    encoding, by at least one processor, a coding unit of the depth image in a simplified depth coding (SDC) mode including a planar mode and a depth modeling mode 1 (DMM1) and excluding a depth coding (DC) mode and a depth modeling mode 2 (DMM2);
    generating, by the at least one processor, a bitstream comprising the SDC mode applied to the coding unit and residual information of the coding unit;
    mapping the residual information of the coding unit to an index based on a depth lookup table (DLT) generated for each frame of the depth image;
    comparing a gray level of a DLT recorded in a sequence parameter set (SPS) to a gray level of the generated DLT; and
    based on the comparing:
        when a similarity between the gray levels is equal to or greater than a reference value, encoding based on the SDC mode, using the DLT recorded in the SPS without a change, and
        when the similarity between the gray levels is less than the reference value, the at least one processor does not process the coding unit of the depth image based on the SDC mode,
    wherein the DMM1 is an SDC mode using an original depth value and a predicted depth value of each segment derived from a top-left sample, a top-right sample, a bottom-left sample, and a bottom-right sample that belong to a same segment in the coding unit.

2. The method of claim 1, wherein the encoding comprises encoding the coding unit based on an SDC mode of an upper block or a left block neighboring a current block corresponding to the coding unit.

3. A method of encoding a depth image, the method comprising:
    encoding, by at least one processor, a coding unit of the depth image based on a simplified depth coding (SDC) mode including a planar mode, a depth coding (DC) mode, and a depth modeling mode 1 (DMM1), and excluding a depth modeling mode 2 (DMM2);

generating, by the at least one processor, a bitstream comprising the SDC mode applied to the coding unit and residual information of the coding unit;

mapping the residual information of the coding unit to an index based on a depth lookup table (DLT) generated for each frame of the depth image;

comparing a gray level of a DLT recorded in a sequence parameter set (SPS) to a gray level of the generated DLT; and based on the comparing:
when a similarity between the gray levels is equal to or greater than a reference value, encoding based on the SDC mode, using the DLT recorded in the SPS without a change, and
when the similarity between the gray levels is less than the reference value, the at least one processor does not process the coding unit of the depth image based on the SDC mode,
wherein the DMM1 is an SDC mode using an original depth value and a predicted depth value of each segment derived from a top-left sample, a top-right sample, a bottom-left sample, and a bottom-right sample that belong to a same segment in the coding unit.

4. The method of claim 3, wherein the encoding comprises encoding the coding unit based on an SDC mode of an upper block or a left block neighboring a current block corresponding to the coding unit.

5. A method of decoding a depth image in a bitstream, the method comprising:
determining, by at least one processor, a simplified depth coding (SDC) mode, including a planar mode and a depth modeling mode 1 (DMM1), and excluding a depth coding (DC) mode and a depth modeling mode 2 (DMM2), associated with an intra prediction applied to a coding unit of the depth image in the bitstream;
decoding, by the at least one processor, the coding unit based on the determined SDC mode;
mapping the residual information of the coding unit to an index based on a depth lookup table (DLT) generated for each frame of the depth image;
comparing a gray level of a DLT recorded in a sequence parameter set (SPS) to a gray level of the generated DLT; and
based on the comparing:
when a similarity between the gray levels is equal to or greater than a reference value, decoding based on the SDC mode, using the DLT recorded in the SPS without a change, and
when the similarity between the gray levels is less than the reference value, the at least one processor does not process the coding unit of the depth image based on the SDC mode,
wherein the DMM1 is an SDC mode using an original depth value and a predicted depth value of each segment derived from a top-left sample, a top-right sample, a bottom-left sample, and a bottom-right sample that belong to a same segment in the coding unit.

6. The method of claim 5, wherein the planar mode is an SDC mode using an original depth value and a predicted depth value based on a top-left sample, a top-right sample, a bottom-left sample and a bottom-right sample among a plurality of samples included in the coding unit.

7. The method of claim 5, wherein the DMM1 is an SDC mode using an original depth value and a predicted depth value of each segment derived from a top-left sample, a top-right sample, a bottom-left sample and a bottom-right sample that belong to the same segment in the coding unit.

8. A method of decoding a depth image in a bitstream, the method comprising:
determining, by at least one processor, a simplified depth coding (SDC) mode, including a planar mode, a depth coding (DC) mode, and a depth modeling mode 1 (DMM1), and excluding a depth modeling mode 2 (DMM2), associated with an intra prediction applied to a coding unit of the depth image in the bitstream;
decoding, by the at least one processor, the coding unit based on the determined SDC mode;
mapping the residual information of the coding unit to an index based on a depth lookup table (DLT) generated for each frame of the depth image;
comparing a gray level of a DLT recorded in a sequence parameter set (SPS) to a gray level of the generated DLT; and
based on the comparing:
when a similarity between the gray levels is equal to or greater than a reference value, decoding based on the SDC mode, using the DLT recorded in the SPS without a change, and
when the similarity between the gray levels is less than the reference value, the at least one processor does not process the coding unit of the depth image based on the SDC mode,
wherein the DMM1 is an SDC mode using an original depth value and a predicted depth value of each segment derived from a top-left sample, a top-right sample, a bottom-left sample, and a bottom-right sample that belong to a same segment in the coding unit.

9. The method of claim 8, wherein the planar mode is an SDC mode using an original depth value and a predicted depth value based on a top-left sample, a top-right sample, a bottom-left sample and a bottom-right sample among a plurality of samples included in the coding unit.

10. The method of claim 8, wherein the DMM1 is an SDC mode using an original depth value and a predicted depth value of each segment derived from a top-left sample, a top-right sample, a bottom-left sample and a bottom-right sample that belong to the same segment in the coding unit.

11. An apparatus for encoding a depth image, the apparatus comprising a processor,
wherein the processor performs:
encoding a coding unit of the depth image based on a simplified depth coding (SDC) mode including a planar mode and a depth modeling mode 1 (DMM1) and excluding a depth coding (DC) mode and a depth modeling mode 2 (DMM2);
generating a bitstream comprising the SDC mode applied to the coding unit and residual information of the coding unit;
mapping the residual information of the coding unit to an index based on a depth lookup table (DLT) generated for each frame of the depth image;
comparing a gray level of a DLT recorded in a sequence parameter set (SPS) to a gray level of the generated DLT; and
based on the comparing:
when a similarity between the gray levels is equal to or greater than a reference value, encoding based on the SDC mode, using the DLT recorded in the SPS without a change, and when the similarity between the gray levels is less than the reference value, the processor does not process the coding unit of the depth image based on the SDC mode, wherein the DMM1 is an SDC mode using an original depth value and a predicted depth value of each segment derived from a top-left sample, a top-right sample, a bottom-left sample, and a bottom-right sample that belong to a same segment in the coding unit.

12. An apparatus for encoding a depth image, the apparatus comprising a processor, wherein the processor performs:

encoding a coding unit of the depth image based on a simplified depth coding (SDC) mode including a planar mode, a depth coding (DC) mode, and a depth modeling mode 1 (DMM1), and excluding a depth modeling mode 2 (DMM2);

generating a bitstream comprising the SDC mode applied to the coding unit and residual information of the coding unit;

mapping the residual information of the coding unit to an index based on a depth lookup table (DLT) generated for each frame of the depth image;

comparing a gray level of a DLT recorded in a sequence parameter set (SPS) to a gray level of the generated DLT; and based on the comparing:

when a similarity between the gray levels is equal to or greater than a reference value, encoding based on the SDC mode, using the DLT recorded in the SPS without a change, and when the similarity between the gray levels is less than the reference value, the processor does not process the coding unit of the depth image based on the SDC mode, wherein the DMM1 is an SDC mode using an original depth value and a predicted depth value of each segment derived from a top-left sample, a top-right sample, a bottom-left sample, and a bottom-right sample that belong to a same segment in the coding unit.

13. An apparatus for decoding a depth image in a bitstream, the apparatus comprising a processor, wherein the processor performs:

determining a simplified depth coding (SDC) mode, including a planar mode and a depth modeling mode 1 (DMM1), and excluding a depth coding (DC) mode and a depth modeling mode 2 (DMM2), associated with an intra prediction applied to a coding unit of the depth image in the bitstream;

decoding the coding unit based on the determined SDC mode;

mapping the residual information of the coding unit to an index based on a depth lookup table (DLT) generated for each frame of the depth image;

comparing a gray level of a DLT recorded in a sequence parameter set (SPS) to a gray level of the generated DLT; and based on the comparing:

when a similarity between the gray levels is equal to or greater than a reference value, decoding based on the SDC mode, using the DLT recorded in the SPS without a change, and when the similarity between the gray levels is less than the reference value, the processor does not process the coding unit of the depth image based on the SDC mode, wherein the DMM1 is an SDC mode using an original depth value and a predicted depth value of each segment derived from a top-left sample, a top-right sample, a bottom-left sample, and a bottom-right sample that belong to a same segment in the coding unit.

14. An apparatus for decoding a depth image in a bitstream, the apparatus comprising a processor, wherein the processor performs:

determining a simplified depth coding (SDC) mode, including a planar mode, a depth coding (DC) mode, and a depth modeling mode 1 (DMM1), and excluding a depth modeling mode 2 (DMM2), associated with an intra prediction applied to a coding unit of the depth image in the bitstream;

decoding the coding unit based on the determined SDC mode;

mapping the residual information of the coding unit to an index based on a depth lookup table (DLT) generated for each frame of the depth image;

comparing a gray level of a DLT recorded in a sequence parameter set (SPS) to a gray level of the generated DLT; and based on the comparing:

when a similarity between the gray levels is equal to or greater than a reference value, decoding based on the SDC mode, using the DLT recorded in the SPS without a change, and when the similarity between the gray levels is less than the reference value, the processor does not process the coding unit of the depth image based on the SDC mode, wherein the DMM1 is an SDC mode using an original depth value and a predicted depth value of each segment derived from a top-left sample, a top-right sample, a bottom-left sample, and a bottom-right sample that belong to a same segment in the coding unit.

* * * * *